United States Patent [19]

Freund et al.

[11] 3,898,075

[45] Aug. 5, 1975

[54] STABILIZED LIQUID COMPOSITIONS

[76] Inventors: Heinz-Eberhard Freund, Brahmstrasse 44, Berlin 45; Alfred Czyzewski, Anton-Ulrichstrasse 3, Wolfenbuttel, both of Germany

[22] Filed: July 3, 1972

[21] Appl. No.: 268,882

Related U.S. Application Data

[63] Continuation of Ser. No. 4,420, Jan. 20, 1970, abandoned.

[52] U.S. Cl................................ 71/111; 71/DIG. 1
[51] Int. Cl.............................................. A01n 9/20
[58] Field of Search........................ 71/111, DIG. 1

[56] References Cited
UNITED STATES PATENTS

| | | | |
|---|---|---|---|
| 2,390,941 | 12/1945 | Jones | 71/117 |
| 3,404,975 | 10/1968 | Wilson et al. | 71/111 |
| 3,546,343 | 12/1970 | Payne et al. | 71/111 |
| 3,692,820 | 9/1972 | Boroschewski | 71/111 |
| 3,718,454 | 2/1973 | Albrecht | 71/DIG. 1 |

*Primary Examiner*—James O. Thomas, Jr.

[57] ABSTRACT

A stabilized liquid composition containing an m-biscarbamate, for use as a herbicide.

5 Claims, No Drawings

STABILIZED LIQUID COMPOSITIONS

This is a continuation of application Ser. No. 4,420 filed Jan. 20, 1970, now abandoned.

This invention relates to the stabilizing of liquid compositions containing m-biscarbamates by the addition of organic acids.

It is known that biscarbamates of the formula

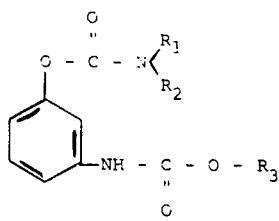

wherein $R_1$ is alkyl, cycloalkyl, aryl which may be substituted by halogen and/or alkyl and/or trifluoromethyl; $R_2$ is hydrogen or alkyl; $R_1$ and $R_2$ jointly with the N-atom may form a heterocyclic ring which may contain additional N and/or O atoms; and $R_3$ is alkyl, alkenyl or alkinyl which may be ω-substituted with halogen, have good herbicidal properties; as indicated in Belgian Pat. No. 679,283.

Among these active agents, particularly, those in which $R_2$ is hydrogen, they have practical application: for example, 3-methoxycarbonylaminophenyl-N-3-methylphenyl-carbamate. They are usually employed in the form of liquid compositions whose essential ingredients include at least one organic solvent and at least one surfactant in addition to the active agent.

It is a disadvantage of such liquid compositions that they are not sufficiently stable and decompose either slightly or fully during storage. As a consequence, the concentration of active agent changes, and the composition loses its effectiveness.

It is known from U.S. Pat. No. 2,954,396 to stabilize N-substituted alkylcarbamates against hydrolytic decomposition. Acetic acid, phosphoric acid, hydrochloric acid, ammonium dihydrogen phosphate, ammonium chloride, ferric chloride and mixtures of these compounds were recommended as stabilizers.

As far as these stabilizers are soluble in the liquid compositions containing m-biscarbamates, they do not or do not adequately stabilize the afore-mentioned liquid compositions.

It has now been found that liquid compositions containing at least one compound of the formula

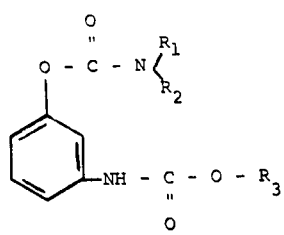

wherein $R_1$ is alkyl, cycloalkyl, aryl which may be substituted by halogen and/or alkyl and/or trifluoromethyl; $R_2$ is hydrogen; and $R_3$ is alkyl, alkenyl or alkinyl which may be ω-substituted by halogen, may be strongly stabilized by the addition of at least one organic acid from the group of aliphatic dicarboxylic acids, aliphatic hydroxycarboxylic acids, nitro-substituted aromatic monocarboxylic acids, aromatic dicarboxylic acids, aliphatic sulfonic acids and aromatic sulfonic acids.

These addition agents have good stabilizing effects in concentrations of about 0.05 to 5 percent by weight, and preferably 0.25 to 1.0 weight per cent. Loss of efficacy during extended storage of the liquid compositions is thereby largely avoided over extended periods or at least strongly reduced.

Particularly suitable stabilizing agents include: oxalic, malonic, maleic, glycolic, lactic, citric, phthalic, 5-nitro-isophthalic, 2-nitrobenzoic, 3,5-dinitrobenzoic, 4-chloro-3-nitrobenzoic, 2-chloro-3,5-dinitrobenzoic, methanesulfonic, benzenesulfonic, p-toluene-sulfonic, and tetrapropylenebenzenesulfonic acids.

The liquid compositions to be stabilized have the usual formulation customary in crop protecting agents. The following ingredients are typical:

1. Compounds of the above formula, particularly 3-methoxycarbonylaminophenyl-N-3-methylphenyl-carbamate as the active agent.
2. Solvents, such as aromatic hydrocarbons, cyclohexanone, isophorone, methylhexahydronaphthalene, dibutyl phthalate, tetrahydronaphthalene, dimethylsulfoxide and dimethylformamide.
3. Surfactants such as polyethoxylated amines, alcohols, acids and alkyl phenols and salts of alkylated benzene and naphthalenesulfonic acids.

The quantitative formula of the liquid compositions is approximately as follows:

5 to 50, preferably 10 to 25% (weight) active agent,
10 to 90, preferably 50 to 70% (weight) solvent,
2 to 40, preferably 10 to 25% (weight) surfactant.

The stabilized liquid compositions are employed as herbicides for controlling undesired plant growth. The herbicide compositions excel particularly for selective control of weeds in certain crop plants, such as sugar, beets and rice, etc. The stabilizers proposed according to the invention do not produce harmful effects of any kind. Furthermore, the liquid compositions may be prepared by simply mixing the afore-described ingredients.

The following Examples further illustrate the invention. In these Examples, percentage figures are by weight.

EXAMPLE 1

Liquid compositions were prepared as follows:
12.5% 3-methoxycarbonylamino-phenyl-N-3-methylphenyl-carbamate;
15.8% emulsifier (a mixture of alkylbenzenesulfonate, polyethoxylated fatty acid and polyethoxylated alkylphenol);
2.3% mixed high-boiling, aromatic hydrocarbons;
68.4% isophorone;
1.0% stabilizer.

The compositions were stored in glass bottles at +70°C. After the periods indicated in the following Table, samples were withdrawn and subjected to thin layer chromatography. In the Table, + indicates no visible decomposition of the active agent (<10% decomposed), and − indicates clearly visible decomposition.

TABLE

| Stabilizer | after 7 days | after 14 days | after 40 days |
|---|---|---|---|
| No addition | − | − | − |
| Oxalic acid | + | + | + |
| Malonic acid | + | + | + |
| Maleic acid | + | + | + |
| Glycolic acid | + | + | + |
| Lactic acid | + | + | + |
| Citric acid | + | + | + |
| Phthalic acid | + | + | + |
| 5-Nitro-isophthalic acid | + | + | + |
| 2-Nitrobenzoic acid | + | + | + |
| 3,5-Dinitrobenzoic acid | + | + | + |
| 4-Chloro-3-nitrobenzoic acid | + | + | + |
| 2-Chloro-3,5-dinitrobenzoic acid | + | + | + |
| Methanesulfonic acid | + | + | + |
| Benzenesulfonic acid | + | + | + |
| p-Toluenesulfonic acid | + | + | + |
| Tetrapropylenebenzenesulfonic acid | + | + | + |
| According to U.S. Pat. No. 2,954,396 above indicated: | | | |
| Phosphoric acid | + | − | − |
| Acetic acid | − | − | − |

Analogous results were also obtained by using the following compounds: 3-methoxycarbonylaminophenyl-N-phenyl-carbamate; 3-ethoxycarbonylaminophenyl-N-3-methylphenylcarbamate; 3-ethoxycarbonylaminophenyl-N-phenylcarbamate; 3-methoxycarbonylaminophenyl-N-3-chlorophenylcarbamate; 3-ethoxycarbonylaminophenyl-N-3-chlorophenyl-carbamate; 3-methoxycarbonylaminophenyl-N-n-butyl-carbamate; 3-methoxycarbonylaminophenyl-N-tert.butyl-carbamate; 3-methoxycarbonylaminophenyl-N-sec.butyl-carbamate; 3-methoxycarbonylaminophenyl-N-pentyl-(2)-carbamate; 3-methoxycarbonylaminophenyl-N-neopentyl-carbamate; 3-methoxycarbonylaminophenyl-N-(3,5-dimethylphenyl)-carbamate.

EXAMPLE 2

Increasing amounts of stabilizer were added to a liquid composition of the following ingredients:
  16.4% 3-methoxycarbonylaminophenyl-N-3-methylphenyl-carbamate
  20.0% emulsifier (as in Example 1)
  3.6% mixed, high-boiling, aromatic hydrocarbons
  60.0% isophorone and the stabilized compositions were stored at the temperatures indicated. Samples were drawn at the times listed in the Table, and the degree of decomposition of the active agent was determined quantitatively.

EXAMPLE 3

The stabilizers listed below were added to a liquid composition of the following ingredients:
  16.7% 3-ethoxycarbonylaminophenyl-N-3-methylphenyl-carbamate
  20.9% emulsifier (as in Example 1)
  4.2% mixed, high-boiling, aromatic hydrocarbons
  54.0% isophorone The compositions were stored at 55° and 70°C. Samples were drawn after the time indicated and subjected to thin layer chromatography. In the table, + indicates no visible decomposition of the active agent, (+) indicates weak visible decomposition of the active agent, and − strong visible decomposition of the active agent.

TABLE

| Stabilizer | Temp. | after 7 days | after 14 days | after 40 days |
|---|---|---|---|---|
| No addition | 55°C | (+) | (+) | − |
|  | 70°C | (+) | − | − |
| 1% malonic acid | 55°C | + | + | + |
|  | 70°C | + | + | (+) |
| 1% maleic acid | 55°C | + | + | + |
|  | 70°C | + | + | + |

TABLE

| Stabilizer | Temp. | after 14 days | after 28 days | after 40 days | after 90 days |
|---|---|---|---|---|---|
| No addition | 20°C | − | − | 5% | 10% |
|  | 50°C | 20% | 35% | 45% | 70% |
|  | 70°C | 75% | 90% | 100% | 100% |
| 0.25% citric acid | 20°C | 0% | 0% | — | — |
|  | 70°C | 0% | 0% | 0% | — |
| 0.5% citric acid | 20°C | 0% | 0% | 0% | — |
|  | 70°C | 0% | 0% | 0% | — |
| 1.0% citric acid | 20°C | 0% | 0% | 0% | — |
|  | 70°C | 0% | 0% | 0% | — |
| 0.5% malonic acid | 20°C | 0% | 0% | 0% | — |
|  | 70°C | 0% | 0% | <5% | — |
| 1.0% malonic acid | 20°C | 0% | 0% | 0% | 0% |
|  | 70°C | 0% | 0% | 0% | <10% |
| 0.5% 3,5-dinitrobenzoic acid | 20°C | 0% | 0% | 0% | — |
|  | 70°C | 0% | 0% | <5% | — |
| 1.0% 3,5-dinitrobenzoic acid | 20°C | 0% | 0% | 0% | — |
|  | 70°C | 0% | 0% | 0% | — |

EXAMPLE 4

The stabilizers listed below were added to a liquid composition of the following ingredients:
- 16.7% 3-ethoxycarbonylaminophenyl-N-phenyl-carbamate
- 31.7% emulsifier (as indicated in Example 1)
- 33.3% isophorone
- 4.2% dibutyl phthalate
- 1.6% methylhexahydronaphthalene
- 12.5% tetrahydronaphthalene The compositions were stored at 55° and 70°C. Samples were drawn after the periods listed and were subjected to thin layer chromatography. The meaning of +, (+), − is as the same as in Example 3, above.

TABLE

| Stabilizer | Temp. | after 7 days | after 14 days | after 40 days |
|---|---|---|---|---|
| No addition | 55°C | (+) | − | − |
|  | 70°C | (+) | − | − |
| 1% malonic acid | 55°C | + | + | + |
|  | 70°C | + | + | (+) |
| 1% lactic acid | 55°C | + | + | + |
|  | 70°C | + | + | + |

EXAMPLE 5

Increasing amounts of malonic acid were added to a liquid composition of the following ingredients:
- 12.5% 3-methoxycarbonylaminophenyl-N-3-methylphenyl-carbamate
- 15.8% emulsifier (as in Example 1)
- 3.3% mixed, high-boiling, aromatic hydrocarbons
- 68.4% isophorone The mixtures so obtained were stored at 20°, 55° and 70°C. Samples were taken after the periods listed and subjected to thin layer chromatography. +, (+), − have the same meaning as above.

TABLE

| Stabilizer | Temp. | after 7 days | after 14 days | after 40 days |
|---|---|---|---|---|
| No addition | 20°C | + | + | (+) |
|  | 55°C | − | − | − |
|  | 70°C | − | − | − |
| 0.1% Malonic acid | 20°C | + | + | + |
|  | 55°C | + | + | + |
|  | 70°C | + | + | (+) |
| 0.25% Malonic acid | 20°C | + | + | + |
|  | 55°C | + | + | + |
|  | 70°C | + | + | + |
| 0.5% Malonic acid | 20°C | + | + | + |
|  | 55°C | + | + | + |
|  | 70°C | + | + | + |
| 1.0% Malonic acid | 20°C | + | + | + |
|  | 55°C | + | + | + |
|  | 70°C | + | + | + |
| 2.0% Malonic acid | 20°C | + | + | + |
|  | 55°C | + | + | + |

TABLE-Continued

| Stabilizer | Temp. | after 7 days | after 14 days | after 40 days |
|---|---|---|---|---|
|  | 70°C | + | + | + |
| 5.0% Malonic acid | 20°C | + | + | + |
|  | 55°C | + | + | + |
|  | 70°C | + | + | + |

EXAMPLE 6

The stabilizers listed below were added to a liquid composition of the following ingredients:
- 16.7% 3-methoxycarbonylaminophenyl-N-phenyl-carbamate
- 20.4% emulsifier (as indicated in Example 1)
- 58.3% isophorone
- 4.6% dimethylsulfoxide The mixtures so obtained were stored at 55° and 70°C in a comparison test with a control without stabilizer. Samples were taken after the periods listed and subjected to thin layer chromatography. In the Table, +, (+) − have the meaning given above.

TABLE

| Stabilizer | Temp. | after 7 days | after 14 days | after 40 days |
|---|---|---|---|---|
| No addition | 55°C | (+) | (+) | − |
|  | 70°C | (+) | − | − |
| 1% Malonic acid | 55°C | + | + | + |
|  | 70°C | + | + | (+) |

EXAMPLE 7

1% Malonic acid was added to a liquid composition of the following ingredients:
- 12.5% 3-methoxycarbonylaminophenyl-N-3-methylphenyl-carbamate
- 15.8% emulsifier (as in Example 1)
- 3.3% mixed, high-boiling, aromatic hydrocarbons
- 68.4% cyclohexanone The mixture so obtained was stored at 70°C together with a control without stabilizer. Samples were drawn and subjected to thin layer chromatography after 26 days and after 40 days. The control showed strong visible decomposition of the active agent after 26 days, but no decomposition was found in the stabilized material after 40 days.

EXAMPLE 8

In a liquid composition prepared from:
- 16.4% 3-methoxycarbonylaminophenyl-N-3-methylphenyl-carbamate
- 20.0% emulsifier (mixture of alkylbenzenesulfonate, polyethoxylated castor oil and polyethoxylated alkylphenol)
- 3.6% mixed, high-boiling, aromatic hydrocarbons
- 60.0% isophorone a portion of the solvent was replaced by varying amounts of citric acid as a stabilizer. The mixtures so obtained were stored four months at 70°C and were thereafter analyzed quantitatively for decomposition of the active agent. In samples containing 0.05% to 5.00% citric acid, no decomposition was found. A control sample without stabilizer was 100% decomposed.

What is claimed is:
1. In a herbicidal liquid composition consisting essen- tially of (a) a herbicidal compound having the formula:

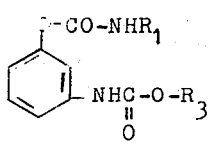

wherein $R_1$ can be alkyl cycloalkyl, or aryl which can be substituted by halogen, alkyl, or trifluoromethyl; $R_3$ can be alkyl, alkenyl, or alkinyl which may carry a terminal halogen; (b) an organic solvent; and (c) at least one surfactant: the improvement which comprises stabilizing the composition against decomposition of the herbicidal compound by incorporating therein against decomposition of the herbicidal compound by incorporating therein from about 0.05% to about 5% by weight of at least one organic acid selected from the group consisting of aliphatic dicarboxylic acids, aliphatic hydrocarbaxylic acids, nitrosubstituted aromatic monocarboxylic acids, aromatic dicarboxylic acids, aromatic sulfonic acids, and aliphatic sulfonic acids.

2. A composition of claim 1 wherein the organic acid is selected from the group consisting of slycollic acid, lactic acid, citric acid, phthalic acid, 5-nitroisophthalic acid, 2-nitrobenzoic acid, 4-chloro-3,5-dinitrobenzoic acid, metanesilfonic acid, 2-chloro-3,5-dinitrobenzoic acid, benzenesulfonic acid, p-toluene sulfonic acid, and tetrapropylenebenzenesulfonic acid.

3. A composition according to claim 2 wherein the organic acid is present in an amount from about 0.25% to about 1%, by weight.

4. A method for stabilizing liquid herbicidal compositions as defined in claim 1 by incorporating therein at least one organic acid stabilizer according to claim 1 in an amount of from about 0.05% to about 5%.

5. A method according to claim 4 wherein the organic acid stabilizer is selected from the group defined in claim 2.

* * * * *